US 12,462,315 B2

United States Patent
Inkpen (10) Patent No.: US 12,462,315 B2
(45) Date of Patent: Nov. 4, 2025

(54) METHODS AND SYSTEMS FOR DETECTING FORMULA LOOPS IN VIRTUAL METER CALCULATIONS

(71) Applicant: HONEYWELL INTERNATIONAL INC., Charlotte, NC (US)

(72) Inventor: Chris Inkpen, Horsham (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 24 days.

(21) Appl. No.: 18/650,109

(22) Filed: Apr. 30, 2024

(65) Prior Publication Data

US 2025/0336011 A1   Oct. 30, 2025

(51) Int. Cl.
*G06Q 50/06* (2024.01)

(52) U.S. Cl.
CPC .................. *G06Q 50/06* (2013.01)

(58) Field of Classification Search
CPC ...................................................... G06Q 50/06
See application file for complete search history.

(56) References Cited

U.S. PATENT DOCUMENTS

| 10,880,362 | B2 | 12/2020 | Paruchuri et al. |
| 10,958,460 | B2 | 3/2021 | Taylor et al. |
| 11,709,965 | B2 | 7/2023 | Park et al. |
| 2012/0066178 | A1* | 3/2012 | Omansky ............... G06Q 10/06 707/626 |
| 2016/0116513 | A1* | 4/2016 | Dutta ........................ G05F 1/66 702/62 |
| 2017/0315696 | A1* | 11/2017 | Jacobson ................. G06F 3/048 |
| 2017/0315697 | A1* | 11/2017 | Jacobson .............. H04L 12/281 |

OTHER PUBLICATIONS

Sungmin Yoon, Virtual sensing in intelligent buildings and digitalization, vol. 143, Nov. 2022, 104578, 20 pages. https://www.sciencedirect.com/science/article/pii/S0926580522004484.

Sahoo et al., Modified Floyd-Warshall's Algorithm for Maximum Connectivity in Wireless Sensor Networks under Uncertainty, Discrete Dynamics in Nature and Society, vol. 2022, Article ID 5973433, 11 pages. https://www.hindawi.com/journals/ddns/2022/5973433/.

* cited by examiner

*Primary Examiner* — Travis R Hunnings (57) ABSTRACT

A method and system for detecting formula loops in virtual meter calculations are disclosed. The method comprises receiving, via at least one processor, a set of data associated with one or more physical meters and one or more virtual meters; creating, via the at least one processor, a dependency network between each of the one or more physical meters and the one or more virtual meters; obtaining, via the at least one processor, a transitive closure matrix for the created dependency network between each of the physical meters and the virtual meters using a predefined model; analyzing, via the at least one processor, a diagonal of the transitive closure matrix to identify one or more non-zero values within the diagonal of the transitive closure matrix in a real time; and generating, via the at least one processor, an alarm for a user upon identifying the one or more non-zero values.

20 Claims, 8 Drawing Sheets

| METER/ DEPENDENT METER | METER1 | METER2 | METER3 | VIRTUAL METER1 | VIRTUAL METER2 | VIRTUAL METER3 | VIRTUAL METER4 |
|---|---|---|---|---|---|---|---|
| METER1 | | | | | | | |
| METER2 | | | | | | | |
| METER3 | | | | | | | |
| VIRTUAL METER1 | | 1 | 1 | | | | |
| VIRTUAL METER2 | | | 1 | 1 | | | |
| VIRTUAL METER3 | | | | 1 | | | |
| VIRTUAL METER4 | 1 | | | | | | |

FIG. 6

| METER/ DEPENDENT METER | METER1 | METER2 | METER3 | VIRTUAL METER1 | VIRTUAL METER2 | VIRTUAL METER3 | VIRTUAL METER4 |
|---|---|---|---|---|---|---|---|
| METER1 | | | | | | | |
| METER2 | | | | | | | |
| METER3 | | | | | | | |
| VIRTUAL METER1 | | | 1 | | | | |
| VIRTUAL METER2 | | 1 | 1 | 1 | | | |
| VIRTUAL METER3 | 1 | 1 | 1 | 1 | | | 1 |
| VIRTUAL METER4 | 1 | 1 | 1 | 1 | | 1 | 1 |

FIG. 7

FIG. 8

METHODS AND SYSTEMS FOR DETECTING FORMULA LOOPS IN VIRTUAL METER CALCULATIONS

TECHNOLOGICAL FIELD

The present invention relates to virtual meters, and more particularly relates to a method and system for detecting formula loops in virtual meter calculations.

BACKGROUND

Virtual representation of various physical quantities, such as energy consumption or flow rate are key aspects in various industrial applications. Typically, virtual meter calculations are employed to achieve virtual representation or a calculated meter point from one or more physical meters. Further, the virtual meter calculations often involve aggregating data from one or more sources, such as sensors or other input sources. The virtual meter collects data from the one or more physical meters, alongside additional sources like sensors or sub-metering devices, to generate a unified and detailed view of energy usage within a system or a facility. Through one or more algorithms and data processing techniques, the virtual meter correlates various data streams, ensuring accurate and real-time insights into energy consumption patterns. Such integration of the virtual meters into external systems enables monitoring of energy, analyzing energy usage with precision, identifying inefficiencies, and implementing targeted strategies for optimization of resources. Inaccurate virtual meter calculations can arise due to presence of formula loops within the calculation process. The formula loops which involve iterative computations based on previous results, can introduce errors that propagate through subsequent iterations. Such iterations usually lead to inaccuracies in the final output of the virtual meter calculations. Such inaccuracies often occur from rounding or truncation of intermediate values, inconsistencies in floating-point arithmetic, and unstable readings caused by non-uniform readings. Additionally, such inaccuracies lead to inaccurate measurements and flawed data analysis. Such inaccuracies may potentially degrade energy consumption assessments, causes financial losses and impacts various other environment resources.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In one example embodiment, a method is disclosed. The method comprises steps of receiving, via at least one processor, a set of data associated with one or more physical meters and one or more virtual meters. Further, the set of data comprises a count of the one or more physical meters and the one or more virtual meters and information related to interdependency between the one or more physical meters and the one or more virtual meters. Further, the method comprises creating, via the at least one processor, a dependency network between each of the one or more physical meters and the one or more virtual meters based at least on the received set of data. Further, the dependency network represents the interdependency between the each of the one or more physical meters and the one or more virtual meters. The method further comprises obtaining, via the at least one processor, a transitive closure matrix for the created dependency network between each of the one or more physical meters and the one or more virtual meters using a predefined model. Further, the transitive closure matrix represents one or more shortest paths between each of the one or more physical meters and the one or more virtual meters. Further, the method comprises steps of analyzing, via the at least one processor, a diagonal of the transitive closure matrix to identify one or more non-zero values within the diagonal of the transitive closure matrix in a real time. Thereafter, the method comprises generating, via the at least one processor, an alarm for a user upon identifying the one or more non-zero values within the diagonal of the transitive closure matrix.

In some embodiments, the predefined model corresponds to a Warshall algorithm based model. The Warshall algorithm based model is configured to determine the one or more shortest paths between each of the one or more physical meters and the one or more virtual meters. In some embodiments, the alarm for the user is generated using an alarm unit communicatively coupled to the at least one processor, upon identifying the one or more non-zero values within the diagonal of the transitive closure matrix.

In some embodiments, the one or more non-zero values correspond to one or more formula loops within the diagonal of the transitive closure matrix.

In some embodiments, the method further comprises steps of indicating, via the at least one processor, at least one of the one or more physical meters and the one or more virtual meters identified with the one or more formula loops over a user interface equipped by the user. Further, the method comprises altering, via the at least one processor, the identified one or more formula loops using the user interface equipped by the user. Thereafter, the method comprises updating, via the at least one processor, the transitive closure matrix upon detecting the alteration in the count of the one or more physical meters and the one or more virtual meters in the real time.

In another example embodiment, a system is disclosed. The system comprises a memory and at least one processor communicatively coupled to the memory. The at least one processor is configured to receive a set of data associated with one or more physical meters and one or more virtual meters. The set of data comprises a count of the one or more physical meters and the one or more virtual meters and information related to interdependency between the one or more physical meters and the one or more virtual meters. Further, the at least one processor is configured to create a dependency network between each of the one or more physical meters and the one or more virtual meters based at least on the received set of data. Further, the dependency network represents the interdependency between the each of the one or more physical meters and the one or more virtual meters. Further, the at least one processor is configured to obtain a transitive closure matrix for the created dependency network between each of the one or more physical meters and the one or more virtual meters using a predefined model. Further, the transitive closure matrix represents one or more shortest paths between each of the one or more physical meters and the one or more virtual meters. Further, the at least one processor is configured to analyze a diagonal of the transitive closure matrix to identify one or more non-zero values within the diagonal of the transitive closure matrix in a real time. Thereafter, the at least one processor is configured to generate an alarm for a user upon identifying the one or more non-zero values within the diagonal of the transitive closure matrix.

In some embodiments, the predefined model corresponds to a Warshall algorithm based model. Further, the Warshall algorithm based model is configured to determine the one or more shortest paths between each of the one or more physical meters and the one or more virtual meters. In some embodiments, the alarm for the user is generated using an alarm unit communicatively coupled to the at least one processor, upon identifying the one or more non-zero values within the diagonal of the transitive closure matrix. In some embodiments, the one or more non-zero values correspond to one or more formula loops within the diagonal of the transitive closure matrix.

In some embodiments, the at least one processor is configured to indicate at least one of the one or more physical meters and the one or more virtual meters identified with the one or more formula loops over a user interface equipped by the user. Further, the at least one processor is configured to alter the identified one or more formula loops using the user interface equipped by the user. In some embodiments, the at least one processor is configured to update the transitive closure matrix upon detecting the alteration in the count of the one or more physical meters and the one or more virtual meters in the real time.

In another example embodiment, a non-transitory machine-readable information storage medium is disclosed. The non-transitory machine-readable information storage medium comprising one or more instructions which when executed by at least one processor to perform operations comprising receiving a set of data associated with one or more physical meters and one or more virtual meters, wherein the set of data comprises a count of the one or more physical meters and the one or more virtual meters and information related to interdependency between the one or more physical meters and the one or more virtual meters; creating a dependency network between each of the one or more physical meters and the one or more virtual meters based at least on the received set of data, wherein the dependency network represents the interdependency between the each of the one or more physical meters and the one or more virtual meters; obtaining a transitive closure matrix for the created dependency network between each of the one or more physical meters and the one or more virtual meters using a predefined model, wherein the transitive closure matrix represents one or more shortest paths between each of the one or more physical meters and the one or more virtual meters; analyzing a diagonal of the transitive closure matrix to identify one or more non-zero values within the diagonal of the transitive closure matrix in a real time; and generating an alarm for a user upon identifying the one or more non-zero values within the diagonal of the transitive closure matrix.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various embodiments of methods and systems for detecting formula loops in virtual meter calculations. Embodiments may comprise a memory and at least one processor may be communicatively coupled to the memory. Embodiments may be configured to receive a set of data that may comprise a count of the one or more physical meters and the one or more virtual meters and information related to interdependency between the one or more physical meters and the one or more virtual meters. Embodiments may be configured to create a dependency network between each of the one or more physical meters and the one or more virtual meters based at least on the received set of data. Embodiments may be configured to represent the interdependency between the each of the one or more physical meters and the one or more virtual meters.

Embodiments may be configured to obtain a transitive closure matrix for the created dependency network between each of the one or more physical meters and the one or more virtual meters using a predefined model that may correspond to a Warshall algorithm based model. Embodiments may be configured to represent one or more shortest paths between each of the one or more physical meters and the one or more virtual meters. Embodiments may be configured to analyze a diagonal of the transitive closure matrix to identify one or more non-zero values that may correspond to one or more formula loops within the diagonal of the transitive closure matrix in a real time. Embodiments may be configured to generate an alarm for a user upon identifying the one or more non-zero values within the diagonal of the transitive closure matrix. Embodiments may be configured to generate the alarm using an alarm unit communicatively coupled to the at least one processor, upon identifying the one or more non-zero values within the diagonal of the transitive closure matrix.

Embodiments may be configured to indicate at least one of the one or more physical meters and the one or more virtual meters identified with the one or more formula loops over a user interface equipped by the user. Embodiments may be configured to alter the identified one or more formula loops using the user interface equipped by the user. Embodiments may be configured to update the transitive closure matrix upon detecting the alteration in the count of the one or more physical meters and the one or more virtual meters in the real time.

Figure 1:
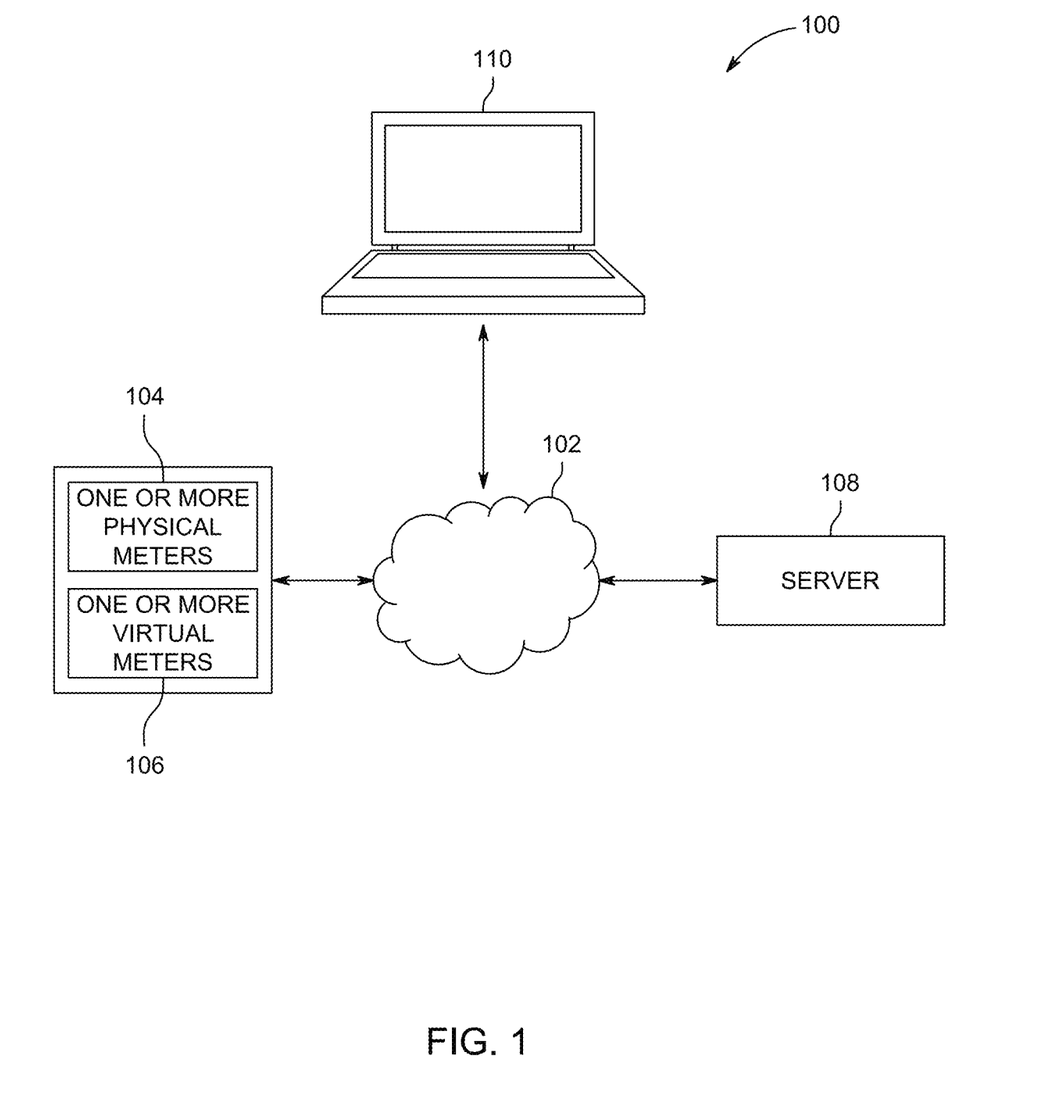
FIG. 1 illustrates a network diagram of a system for detecting formula loops in virtual meter calculations in accordance with an example embodiment of the present disclosure.

FIG. 1 illustrates a network diagram of a system 100 for detecting formula loops in virtual meter calculations, in accordance with an example embodiment of the present disclosure. The system 100 may comprise a network 102 communicatively coupled to one or more physical meters 104 and one or more virtual meters 106. Further, the system 100 may comprise a server 108 and a user device 110.

In some embodiments, the network 102 may be a communication network such as internet or a cloud network, that may be configured to allow computing devices and processing systems to communicate with each other through wired network, wireless network, or a combination of both. In some embodiments, the network 102 may refer to as a distributed infrastructure that is configured to exchange of data, information, and resources among interconnected computing devices and systems. The network 102 may be designed to facilitate communication and collaboration across various locations, devices, and platforms. Those skilled in the art will recognize that wired devices may include, but are not limited to, wired networks such as Wide Area Networks (WANs) or Local Area Networks (LANs), while wireless devices may include wireless communications established via Radio Frequency (RF) signals or infrared signals. Various devices in the system 100 may connect to the network 102 in accordance with various wired and wireless communication protocols such as Transmission Control Protocol and Internet Protocol (TCP/IP), User Datagram Protocol (UDP), and 2G, 3G, or 4G communication protocols.

In some embodiments, the one or more physical meters 104 may be installed within a building (not shown). In some embodiments, the one or more physical meters 104 may refer to devices used for measuring physical quantities such as length, mass, volume, temperature, etc. In some embodiments, the one or more physical meters 104 are configured to provide a numerical value corresponding to the quantity being measured. In at least one example, the numeric value includes rulers, weighing scales, thermometers, and more sophisticated instruments like voltmeters, ammeters, and spectrophotometers. Further, the one or more physical meters 104 may be configured to determine readings associated with one or more media associated with the building. Further, the one or media may comprise at least one of an electricity, water, or gas. Further, each physical meter from the one or more physical meters 104 may be configured to operate on a principle of determining the readings of the one or more media passing through or in proximity to at least one specific physical meter from the one or more physical meters 104.

In at least one example, the one or more physical meters 104 may correspond to a water meter that may be operationally coupled with at least one turbine. Further, the water meter may be configured to determine a volume of water passed through the at least one turbine. Further, the water meter may be configured to determine rotations of one or more impeller blades of the at least one turbine. Further, the rotations of the one or more impeller blades may be directly proportional to a flow rate of the water. Further, the water flows through the water meter, the at least one turbine may be configured to rotate. Further, the rotations of the at least one turbine may be recorded to determine the volume of water.

In another example, the one or more physical meters 104 may correspond to an electricity meter that may be configured to determine an electricity consumption by the building. Further, the electricity meter may be configured to operate on a principle of electromagnetic induction. In some embodiments, the electricity meter may comprise set of coils that may be configured to carry a pre-defined amount of electric current. Further, the electric current may be configured to generate a magnetic field, that may induce a voltage in an another set of coils. Further, the induced voltage may be recorded to determine the amount of electricity consumed by the building.

In some embodiments, the one or more physical meters 104 may comprise at least one sensing element (not shown) such as one or more sensor, sensing probes or one or more gears. Further, the at least one sensing element may be configured to determine the readings associated with the one or more media. Further, the one or more sensors may comprise at least one of a light detection and ranging (LiDAR) sensor, a hall-effect sensor. In some embodiments, the one or more physical meters 104 may comprise at least one display panel (not shown). In some embodiments, the at least one display panel may be communicatively coupled with the at least one sensing element. Further, the at least one display panel may be configured to display a data related to the calculated readings at a user interface. In various examples, the one or more physical meters 104 may be embedded with communication protocols. Further, the communication protocols may be configured to enable the one or more physical meters 104 to transmit the readings remotely to a concerned authority's server for monitoring and billing purposes.

The system 100 may further comprise the one or more virtual meters 106. In some embodiments, the one or more virtual meters 106 on the other hand are not physical devices but rather software-based tools or simulations that emulate the functionality of one or more physical meters 104. The one or more virtual meters 106 typically exist in virtual environments, such as computer programs, simulations, or digital dashboards. In some embodiments, the one or more virtual meters 106 are designed to represent and measure various physical quantities in a digital format. In at least one example, the one or more virtual meters 106 may be installed at a remote location. Further, each virtual meter from the one or more virtual meters 106 may be associated with at least one physical meter from the one or more physical meters 104. In some embodiments, each virtual meter from the one or more virtual meters 106 may be configured to provide accurate measurements and analytics associated with the readings of the one or more media. In some embodiments, the one or more virtual meters 106 may be configured to utilize one or more data and analytics associated with the readings of the one or more media by the one or more physical meters 104.

In at least one example, at least one virtual meter from the one or more virtual meters 106 may be associated with the at least one physical meter (i.e., electricity meter) from the one or more physical meters 104. Further, the at least one physical meter may be configured to determine the readings (i.e., voltage, current and power usage). Further, the at least one virtual meter may be configured to receive and process the data from the at least one physical meter. In some embodiments, the at least one virtual meter may be configured to provide the accurate measurements and analytics associated with the readings. In at least one example, the one or more data processing modules of the at least one virtual meter may comprise at least one of a signal processing module, a statistical analytics module, a machine learning (ML) module and like. Further, the one or more data processing modules may be configured to filter noise from the data, detect patterns, and determine precise readings. Further, the at least one virtual meter from the one or more virtual meters 106 may be configured to analyze fluctuations in the voltage and current to determine the actual power consumed by various appliances in the building.

In some embodiments, the building may be installed with one or more modules (not shown) that may be configured to determine a count of the one or more physical meters 104 installed in the building and a count of the one or more virtual meters 106 associated with each of the one or more physical meters 104. In at least one example, the one or more modules may correspond to energy monitoring modules, Internet of Things (IoT) devices, power line communication (PLC) sensors or like.

In some embodiments, the system 100 may further comprise the server 108. Further, the server 108 may be a computer or software module that is configured to provide centralized resources, data, or services to the user device 110 operated by a user. The server 108 may be configured to handle and manage one or more computational tasks and data processing within the system 100. In some embodiments, the server 108 may include storage systems, such as hard drives or storage arrays, to store and manage large volumes of data and information accessible to network users. In some embodiments, the server 108 may further provide centralized control and management capabilities, allowing network administrators to configure, monitor, and maintain network resources, security settings, and user access permissions from a single location.

In some embodiments, the server 108 may be configured to receive a set of data associated with the one or more physical meters 104 and the one or more virtual meters 106. Further, the set of data may comprise the count of the one or more physical meters 104 and the one or more virtual meters 106. Further, the set of data may further comprise information related to interdependency between the one or more physical meters 104 and the one or more virtual meters 106. Further, the server 108 may be configured to receive the first set of data for a pre-defined period of time. In some embodiments, the pre-defined period of time may comprise at least day, weeks, months, years.

In some embodiments, the server 108 may be configured to create a dependency network between each of the one or more physical meters 104 and each of the one or more virtual meters 106. Further, the dependency network may be created by the server 108, based at least on the set of data received. In some embodiments, the server 108 may be configured to obtain a transitive closure matrix for the created dependency network between each physical meter from the one or more physical meters 104 and each virtual meter from the one or more virtual meters 106. In some embodiments, the sever 108 may be configured to obtain the transitive closure matrix using a predefined model. Further, the predefined model may correspond to a Warshall algorithm based model. Further, the Warshall algorithm based model may be configured to determine one or more shortest paths between each physical meter from the one or more physical meters 104 and each virtual meter from the one or more virtual meters 106.

In some embodiments, the server 108 may be configured to analyze a diagonal of the transitive closure matrix to identify one or more non-zero values within the diagonal of the transitive closure matrix in a real time. Further, the one or more non-zero values may correspond to one or more formula loops within the diagonal of the transitive matrix. In some embodiments, the server 108 may be configured to generate an alarm for a user upon identifying the one or more non-zero values within the diagonal of the transitive closure matrix. Further, the server 108 may be configured to alert the identified one or more formula loops using the user device 110 equipped by the user.

In some embodiments, the system 100 may further comprise the user device 110. In some embodiments, the user device 110 may be communicatively coupled with the server 108 using one or more wireless communication modules. Further, the one or more wireless communication modules may comprise at least one of a Bluetooth, wireless-fidelity (Wi-Fi), or like. In various other examples, the user device 110 may be communicatively coupled with the server 108 using one or more wired communication modules. Further, the one or more wired communication modules may comprise at least one of an Ethernet cable, optical fiber cable, or like.

In some embodiments, the user device 110 may be equipped by the user to perform one or more operations. Further, the user device 110 may comprise at least one of a mobile phone, laptop, tablet or like. Further, the user device 110 may be configured to indicate the user regarding at least one of the one or more physical meters 104 and at least one of the one or more virtual meters 106 identified with the one or more formula loops. Further, the user device 110 may be accessed by the user to alter the identified one or more formula loops. Further, the server 108 may be configured to update the transitive closure matrix upon detecting the alteration in the count of the one or more physical meters 104 and the one or more virtual meters 106 in the real time.

It will be apparent to one skilled in the art that above-mentioned components of the system 100 have been provided only for illustration purposes, without departing from the scope of the disclosure.

Figure 2:
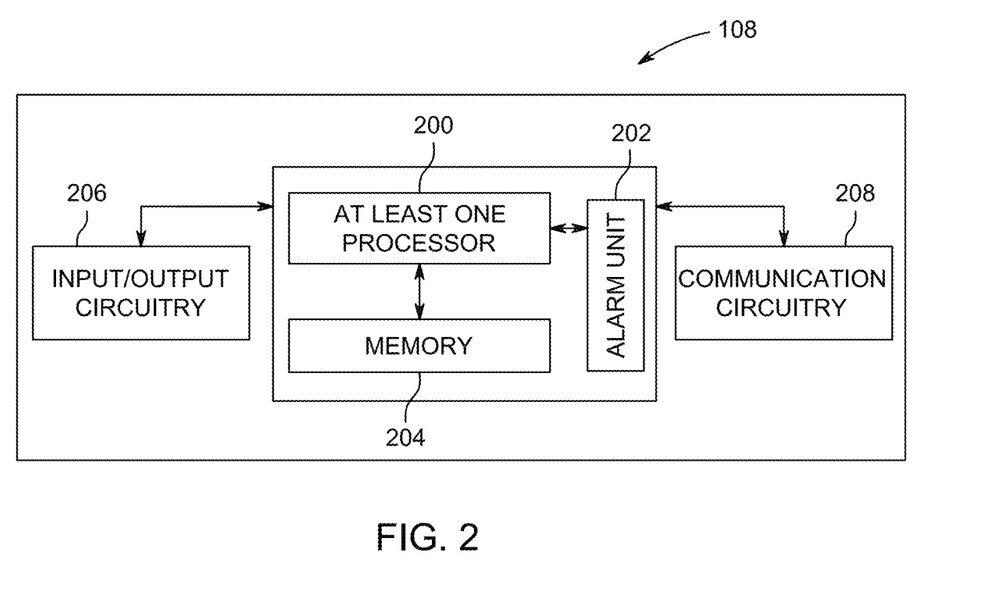
FIG. 2 illustrates a block diagram of a server in accordance with an example embodiment of the present disclosure.

FIG. 2 illustrates a block diagram of the server 108, in accordance with an example embodiment of the present disclosure. The server 108 may comprise at least one processor 200, an alarm unit 202, a memory 204, an input/output circuitry 206, and a communication circuitry 208.

In some embodiments, the at least one processor 200 may be configured to receive the set of data associated with the one or more physical meters 104 and the one or more virtual meters 106 from the one or more modules installed in the building. Further, the set of data may comprise the count of the one or more physical meters 104 and the one or more virtual meters 106. Further, the set of data may further comprise information related to interdependency between the one or more physical meters 104 and the one or more virtual meters 106.

In some embodiments, the at least one processor 200 may be configured to create the dependency network between each of the one or more physical meters 104 and each of the one or more virtual meters 106. Further, the dependency network may be created by the at least one processor 200, based at least on the set of data received. In some embodiments, the dependency network may represent the interdependency between each of the one or more physical meters 104 and the one or more virtual meters 106.

In one example, a building-A may comprise electricity and water meters installed on each floor. The electricity meter (meter A1) on floor 1 may be configured to measure the consumption associated with the floor 1. Further, the meter A1 may be linked to two virtual meters (virtual meter V1 and virtual meter V2). The virtual meter V1 may be configured to detect the electricity usage of floor 1 with other common areas, like hallways and lobby (considered essential spaces). Further, the virtual meter V2 may be dedicated to tack the electricity usage of specific equipment, like HVAC system, on Floor 1.

Further, in Building B, Floor 2, a water meter (meter B2) may be installed that may be configured to measure the water consumption for floor 2. Further, the meter B2 may be associated with a virtual meter (virtual meter V3). The virtual meter V3 may be configured to aggregates the water usage of floor 2 along with other floors for a comprehensive overview of water consumption across the building. Herein, such setup forms a dependency network where physical meters (meter A1 and meter B2) may be interconnected with their respective virtual meters (V1, V2, and V3). Further, the created dependency network may be configured to depict a flow of data associated with each individual meter. Further, the depicted flow of data may contribute to a broader insight into energy and resource consumption within the building.

In some embodiments, the at least one processor 200 may be configured to obtain a transitive closure matrix for the created dependency network between each physical meter from the one or more physical meters 104 and each virtual meter from the one or more virtual meters 106. In some embodiments, the sever may be configured to obtain the transitive closure matrix using the Warshall algorithm based model. Further, the Warshall algorithm based model may be configured to determine one or more shortest paths between each physical meter from the one or more physical meters 104 and each virtual meter from the one or more virtual meters 106.

In some embodiments, the Warshall algorithm based model may be configured to define a topology between each physical meter from the one or more physical meters 104 with each virtual meter from the one or more virtual meters 106. Further, the topology may be configured to comprise a plurality of possible routes between each of the one or more physical meters 104 and each of the one or more virtual meters 106. Further, the transitive closure matrix may comprise a plurality of rows and a plurality of columns. Further, each of the rows from the plurality of rows and each of the columns from the plurality of columns may be configured to represent an individual pathway depicting the interdependency between each of the one or more physical meters 104 with each of the one or more virtual meters 106.

In some embodiments, the at least one processor 200 may be configured to analyze a diagonal of the transitive closure matrix to identify one or more non-zero values within the diagonal of the transitive closure matrix in a real time. Further, the one or more non-zero values may correspond to one or more formula loops within the diagonal of the transitive matrix. In some embodiments, the at least one processor 200 may be configured to generate an alarm for a user upon identifying the one or more non-zero values within the diagonal of the transitive closure matrix.

In one example, the transitive closure matrix may comprise a row A1 and columns V1, V2, and V3. The row A1, columns V1, V2, and V3 may comprise a value of 1. Further, the value of 1 may be configured to indicate dependencies from meter A1 to virtual meters V1, V2, and V3. Further, the diagonal elements (A1, A1), (B2, B2), (V1, V1), (V2, V2), and (V3, V3) may be of value of 1, that may indicate that there may be a direct dependency from each node to itself. Further, the diagonal elements may be analyzed. Thereafter, when all the diagonal element holds the non-zero value an alarm may be generated by the at least one processor 200. Further, the at least one processor 200 may be configured to indicate the non-zero value on a computer display equipped by the user indicating all the loop in the transitive closure matrix.

In some embodiments, the alarm for the user may be generated using the alarm unit 202. Further, the alarm unit 202 may be communicatively coupled with the at least one processor 200. Further, the alarm unit 202 may be configured to generate the alarm upon identifying the one or more non-zero values within the diagonal of the transitive closure matrix. Further, the alarm unit 202 may correspond to a speaker, a display panel or like. In at least one example, when the alarm unit 202 corresponds to the speaker. Further, the speaker may be configured to generate a beep sound, a siren sound or like to alert the user regarding the identified one or more formula loops. In another example, when the alarm unit 202 correspond to the display panel. Further, the display panel may be configured to display a pop-up notification, a warning message, or like to alert the user regarding the identified one or more formula loops.

The at least one processor 200 may include suitable logic, circuitry, and/or interfaces that are operable to execute one or more instructions stored in the memory 204 to perform predetermined operations. In one embodiment, the at least one processor 200 may be configured to decode and execute any instructions received from one or more other electronic devices or server(s). The at least one processor 200 may be configured to execute one or more computer-readable program instructions, such as program instructions to carry out any of the functions described in this description. Further, the processor may be implemented using one or more processor technologies known in the art. Examples of the at least one processor 200 includes, but are not limited to, one or more general purpose processors and/or one or more special purpose processors.

In some embodiments, the memory 204 may be configured to store a set of instructions and data executed by the at least one processor 200. Further, the memory 204 may include the one or more instructions that are executable by the at least one processor 200 to perform specific operations. The memory 204 may be configured to include the instructions to receive the set of data from the pre-defined period of time. The memory 204 may be configured to include the instructions to create the dependency network between each of the one or more physical meters 104 and the one or more virtual meters 106. Further, the memory 204 may be configured to include the instructions to obtain the transitive closure matrix for the created dependency network.

The memory 204 may be configured to include the instructions analyze the diagonal of the transitive closure matrix to identify the one or more non-zero values within the diagonal of the transitive closure matrix. The memory 204 may be configured to include the instructions to generate the alarm for the user upon identifying the one or more non-zero values. It is apparent to a person with ordinary skill in the art that the one or more instructions stored in the memory 204 enable the hardware of the server 108 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the server 108 may further comprise the input/output circuitry 206. The input/output circuitry 206 may enable the user to communicate or interface with the server 108, via the user device 110. The user device 110 may include N number of user devices. In some embodiments, the input/output circuitry 206 may act as a medium to transmit input from the interface to and from the server 108. In some embodiments, the input/output circuitry 206 may refer to the hardware and software components that facilitate the exchange of information between user device 110 and the server 108. In at least one example, the user device 110 may include a graphical user interface (GUI) (not shown) as input circuitry to allow the one or more users to input data. The input/output circuitry 206 may include various input devices such as keyboards, barcode scanners, GUI for the one or more users to provide data and various output devices such as displays, printers for the one or more users to receive data. In another example, the input/output circuitry 206 may include various output circuitry such as a display to show the alarm and/or the readings associated with the one or more media.

In some embodiments, the server 108 may further comprise the communication circuitry 208. The communication circuitry 208 may allow the server 108 to exchange data or information with other systems or apparatuses. Further, the communication circuitry 208 may include network interfaces, protocols, and software modules responsible for sending and receiving data or information. In some embodiments, the communication circuitry 208 may include Ethernet ports, Wi-Fi adapters, or communication protocols like HTTP or MQTT for connecting with other systems. The communication circuitry 208 may further include components such as communication modules (e.g., Wi-Fi, Ethernet, cellular), transceivers, antennas, and protocols (e.g., TCP/IP, MQTT, SNMP) for exchanging data with other systems or network devices. The communication circuitry 208 may allow the server 108 to stay up-to-date and accurately track the at least one normalized alerts.

In some embodiments, the input/output circuitry 206 and the communication circuitry 208 may be configured to integrate the at least one normalized alarm data with other systems such as Supervisory Control and Data Acquisition (SCADA), Building Management Systems (BMS), Enterprise Asset Management (EAM) systems, or third-party monitoring platforms for centralized monitoring, analysis, and control by operators and automated processes.

It will be apparent to one skilled in the art the above-mentioned components of the server 108 have been provided only for illustration purposes, without departing from the scope of the disclosure.

Figure 3:
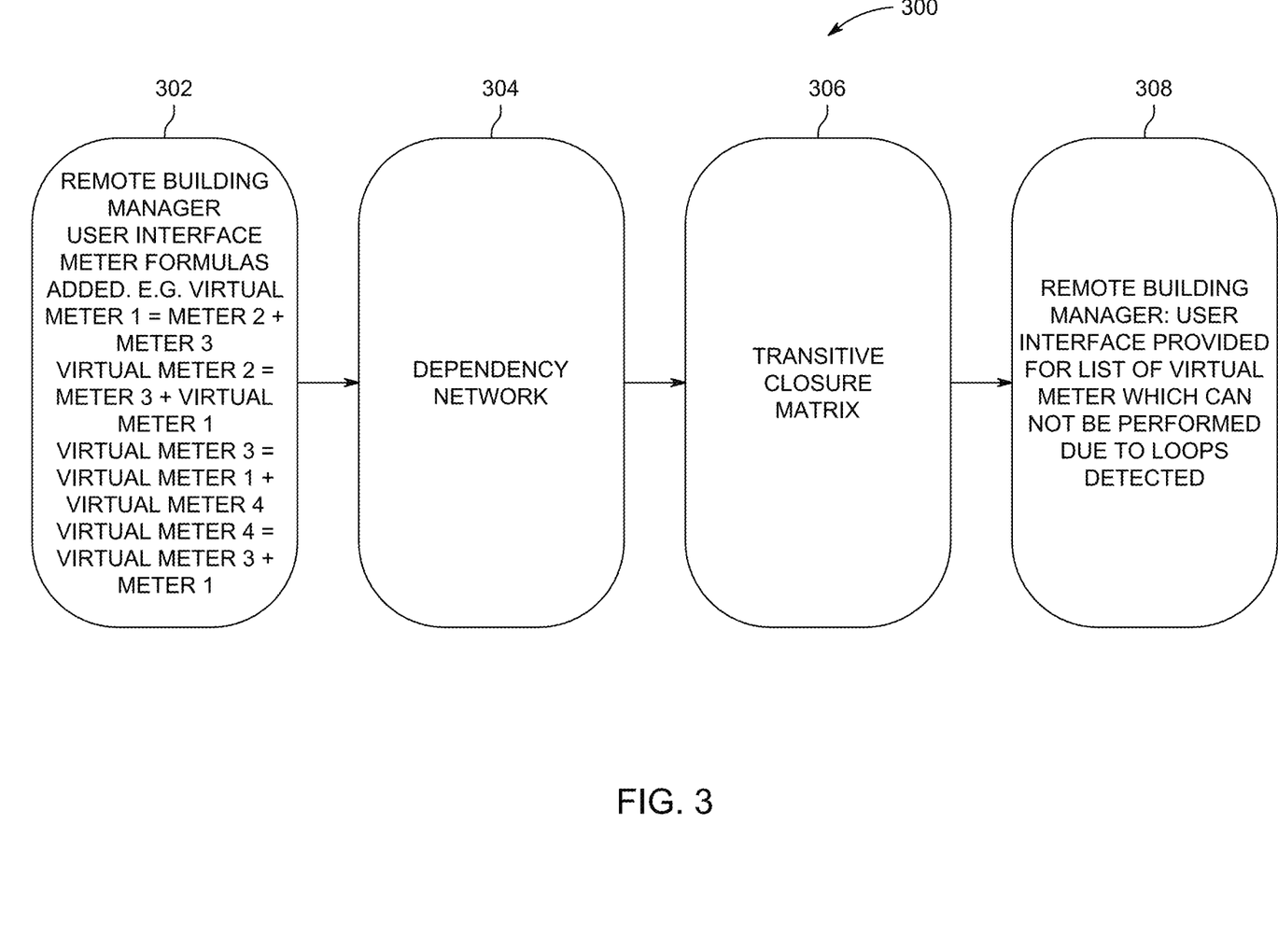
FIG. 3 illustrates a block diagram of a method for detecting the formula loops in the virtual meter calculations in accordance with an example embodiment of the present disclosure.
Figure 4:
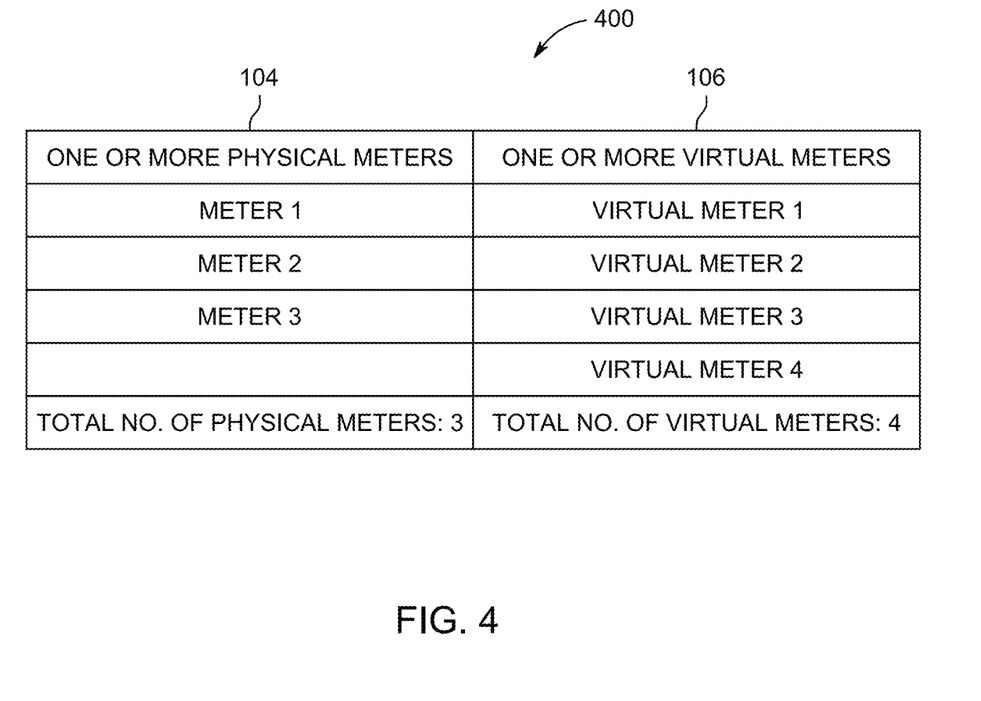
FIG. 4 illustrates a table showing a set of data associated with the one or more physical meters and the one or more virtual meters in accordance with an example embodiment of the present disclosure.
Figure 5:
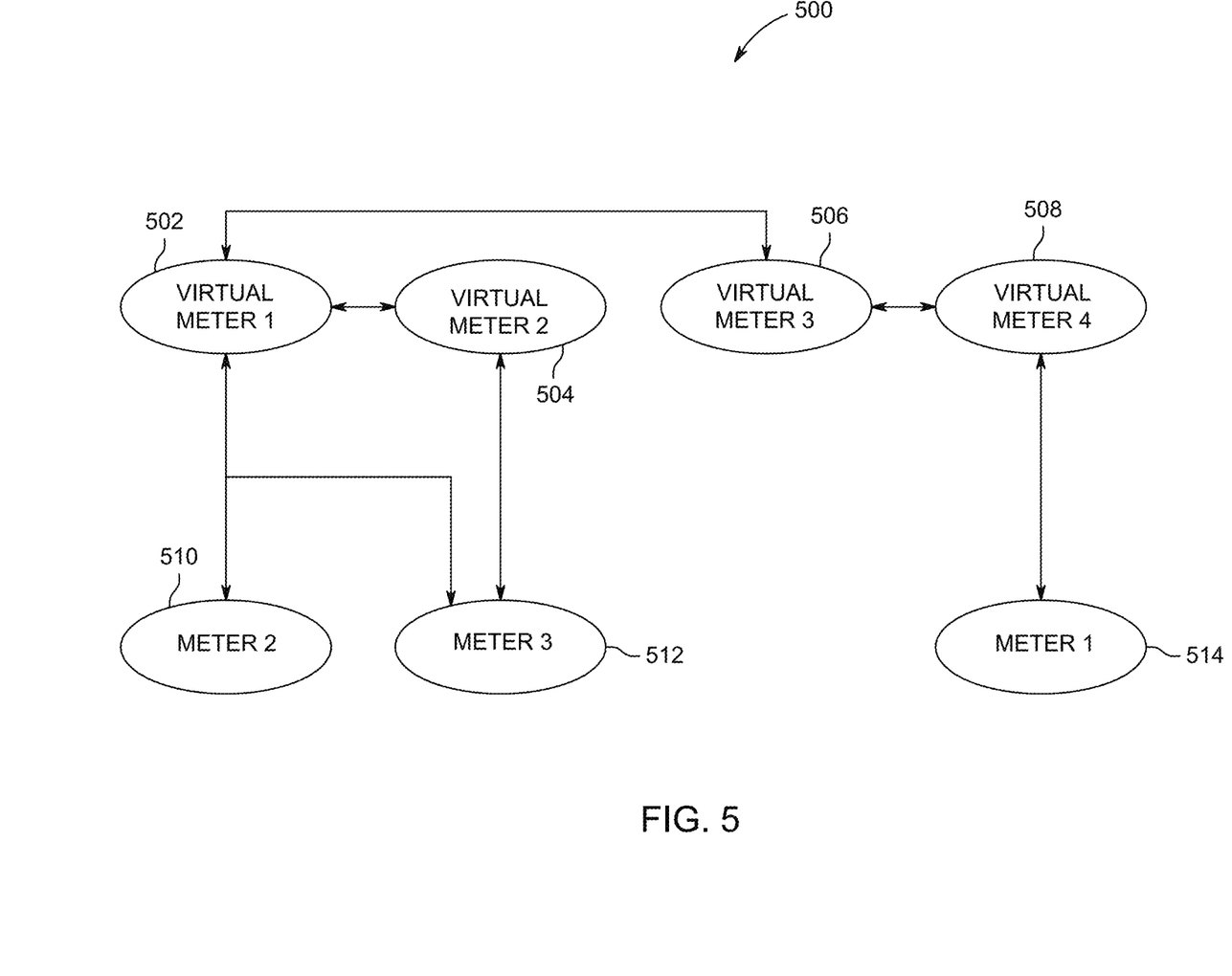
FIG. 5 illustrates a dependency network diagram of the one or more physical meters and the one or more virtual meters in accordance with an example embodiment of the present disclosure.
Figure 6:
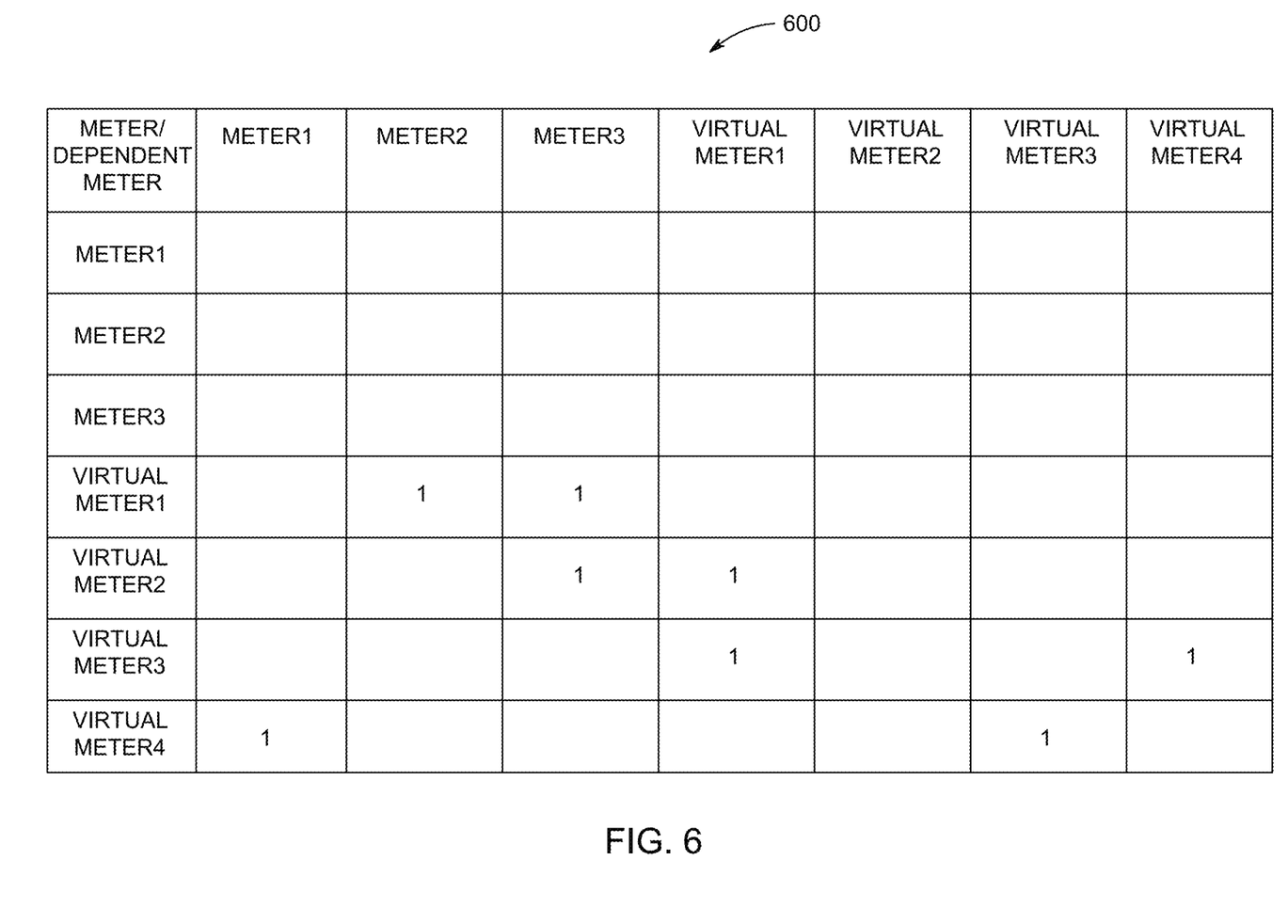
FIG. 6 illustrates a table showing an interdependency between the each of the one or more physical meters and the one or more virtual meters in accordance with an example embodiment of the present disclosure.
Figure 7:
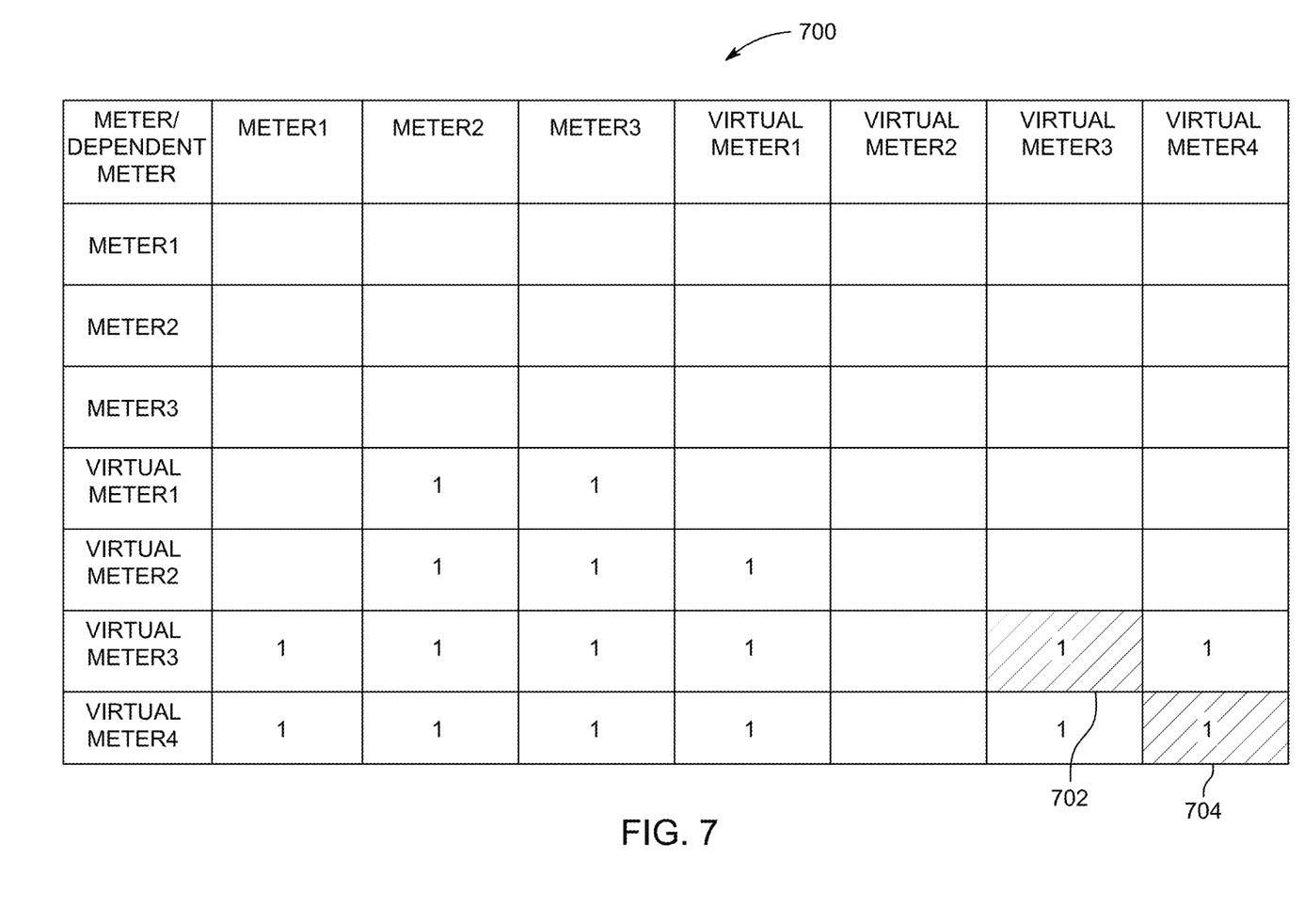
FIG. 7 illustrates a table showing a transitive closure matrix representing one or more shortest paths between each of the one or more physical meters and the one or more virtual meters in accordance with an example embodiment of the present disclosure.

FIG. 3 illustrates a block diagram 300 of a method for detecting the formula loops in the virtual meter calculations, in accordance with an example embodiment of the present disclosure. FIG. 4 illustrates a table 400 showing a set of data associated with the one or more physical meters 104 and the one or more virtual meters 106, in accordance with an example embodiment of the present disclosure. FIG. 5 illustrates a dependency network diagram 500 of the one or more physical meters 104 and the one or more virtual meters 106, in accordance with an example embodiment of the present disclosure. FIG. 6 illustrates a table 600 showing an interdependency between the each of the one or more physical meters 104 and the one or more virtual meters 106, in accordance with an example embodiment of the present disclosure. FIG. 7 illustrates a table 700 showing a transitive closure matrix representing one or more shortest paths between each of the one or more physical meters 104 and the one or more virtual meters 106, in accordance with an example embodiment of the present disclosure FIGS. 4-7 are described in conjunction with FIG. 3.

At operation 302, the building may be installed with a remote building manager. Further, the remote building manager may be configured to determine the set of data (i.e., count of the one or more physical meters 104 installed within the building and the one or more virtual meters 106). Further, the remote building manager may be configured to determine one or more meter formulas that may depict the inter-dependency between the one or more physical meters 104 and the one or more virtual meters 106. In at least one example, the one or more meter formulas may comprise at least one of VIRTUAL METER-1 502=METER-2 512+METER-3 514, VIRTUAL METER 2 504=METER-3 514+VIRTUAL METER-1 502, VIRTUAL METER-3 506=VIRTUAL METER-1 502+VIRTUAL METER-4 508, and VIRTUAL METER-4 508=VIRTUAL METER-3 506+METER-1 510.

As illustrated in FIG. 4, the table 400 may be configured to illustrate the set of data associated with the one or more physical meters 104 and the one or more virtual meters 106. In some embodiments, the set of data may correspond the count of the one or more physical meters 104 and the count of the one or more virtual meters 106 installed in the building. In some embodiments, the table 400 comprises at least one column and another column. Further, the at least one column correlates to the count of the one or more physical meters 104 installed in the building. Further, the another column correlates to the count of the one or more virtual meters 106 installed at the remote location.

In some embodiments, the at least one column contains the one or more physical meters 104 (i.e., METER-1 510, METER-2 512, and METER-3 514). Further, the another column contains the one or more virtual meters 106 (i.e., VIRTUAL METER-1 502, VIRTUAL METER-2 504, VIRTUAL METER-3 506, and VIRTUAL METER-4 508). Further, the total number of the one or more physical meters 104 is 3. Further, the total number of the one or more virtual meters 106 is 4. In at least one example, the METER-1 510 may be inter-dependent with the VIRTUAL METER-2 504 and the VIRTUAL METER-4 508. In another example, the METER-2 512 and METER-3 514 may be inter-dependent with the VIRTUAL METER-1 502, the VIRTUAL METER-2 504, and the VIRTUAL METER-4 508.

At operation 304, the dependency network may be created by the at least one processor 200 communicatively coupled with the remote building manager. Further, the dependency network may be created, based at least on the set of data (as illustrated in FIG. 4). Further, the dependency network may be configured to represent the interdependency between each of the one or more physical meters 104 and the one or more virtual meters 106. For example, the dependency network may comprise the interdependency between the VIRTUAL METER-1 502, VIRTUAL METER-2 504, VIRTUAL METER-3 506, METER-1 510, METER-2 512, and METER-3 514.

As illustrated in FIG. 5, the dependency network diagram 500 may be configured to represent the interdependency between the VIRTUAL METER-1 502, VIRTUAL METER-2 504, VIRTUAL METER-3 506, METER-1 510, METER-2 512, and METER-3 514. Further, the VIRTUAL METER-1 502 may be interdependent with the METER-2 512 and the METER-3 514. Further, the VIRTUAL METER-2 504 may be interdependent with the METER-3 514 and the VIRTUAL METER-1 502. Further, the VIRTUAL METER-3 506 may be interdependent with the VIRTUAL METER-1 502 and VIRTUAL METER-4 508. Further, the VIRTUAL METER-4 508 may be interdependent with the VIRTUAL METER-3 506 and the METER-1 510.

As illustrated in FIG. 6, the table 600 may comprise a data associated with the dependency network between each of the one or more physical meters 104 and the one or more virtual meters 106. In some embodiments, the table 600 may comprise the one or more non-zero values that may represent the interdependency between each of the one or more physical meters with each of the one or more virtual meters.

In some embodiments, the table 600 may be configured to illustrate the data associated with the dependency network between each of the one or more physical meters 104 and the one or more virtual meters 106, based at least on the set of data (as illustrated in FIG. 4). In some embodiments, the at least one processor 200 of the server 108 may be configured to create the dependency network. In some embodiments, the table 600 contains a plurality of rows and a plurality of columns. In some embodiments, each of the plurality of rows and each of the plurality of columns may be configured to form one or more paths associated with the interdependency between the each of the one or more physical meters 104 and the one or more virtual meters 106.

As illustrated in FIG. 6, the VIRTUAL METER-1 502 is inter-dependent with the METER-2 512 and the METER-3 514. Further, the VIRTUAL METER-2 504 is inter-dependent with the METER-3 514 and the VIRTUAL METER-1 502. Further, the VIRTUAL METER-3 506 is inter-dependent with the VIRTUAL METER-1 502 and the VIRTUAL METER-4 508. Thereafter, the VIRTUAL METER-4 508 is inter-dependent with the VIRTUAL METER-3 506 and METER-1 510.

At operation 306, the transitive closure matrix may be obtained by the at least one processor 200 of the server 108. Further, the transitive closure matrix may be associated with the created dependency network of between each of the one or more physical meters 104 and the one or more virtual meters 106 (as illustrated in FIGS. 5 and 6). In some embodiments, the transitive closure matrix may be obtained by the at least one processor 200, using the predefined model (i.e., the Warshall algorithm based model). Further, the transitive closure matrix may be configured to represent the one or more shortest paths between each of the one or more physical meters 104 and the one or more virtual meters 106.

As illustrated in FIG. 7, the table 700 may comprise a data associated with the transitive closure matrix that may be comprise the one or more shortest paths between each of the one or more physical meters 104 and the one or more virtual meters 106, based at least on the dependency network (as illustrated in FIGS. 5 and 6). In some embodiments, the at least one processor 200 of the server 108 may be configured to obtain the transitive closure matrix. In some embodiments, the table 700 contains a plurality of rows and a plurality of columns. In some embodiments, each of the plurality of rows and each of the plurality of columns may be configured to represent the one or more shortest paths between each of the one or more physical meters 104 and the one or more virtual meters 106.

As illustrated in FIG. 7, the VIRTUAL METER-1 502 is inter-dependent with the METER-2 512 and the METER-3 514. Further, the VIRTUAL METER-2 504 is inter-dependent with the METER-2 512, the METER-3 514 and the VIRTUAL METER-1 502. Further, the VIRTUAL METER-3 506 is inter-dependent with the METER-1 510, the METER-2 512, the METER-3 514, the VIRTUAL METER-1 502, the VIRTUAL METER-3 506 and the VIRTUAL METER-4 508. Thereafter, the VIRTUAL METER-4 508 is inter-dependent with the METER-1 510, the METER-2 512, the METER-3 514, the VIRTUAL METER-1 502, the VIRTUAL METER-3 506 and the VIRTUAL METER-4 508.

In some embodiments, the VIRTUAL METER-3 506 is inter-dependent with the VIRTUAL METER-3 506, thereby the VIRTUAL METER-3 506 is identified to be in at least one formula loop (as illustrated by 702). In some embodiments, the VIRTUAL METER-4 508 is inter-dependent with the VIRTUAL METER-4 508, thereby the VIRTUAL METER-4 508 is identified to be in at least one formula loop (as illustrated by 704).

At operation 308, the remote building manager may comprise the alarm unit 202 (e.g. a display panel). Further, the at least one processor 200 may be configured to identify the one or more physical meters 104 and the one or more virtual meters 106 with the one or more formula loops. Further, the at least one processor 200 may be configured to generate an alarm that may cause the display panel to show a list of the one or more physical meters 104 and the one or more virtual meters 106 identified with the one or more formula loops.

In some embodiments, the alarm unit 202 may correspond to a speaker, a display panel or like. In at least one example, when the alarm unit 202 corresponds to the speaker. Further, the speaker may be configured to generate a beep sound, a siren sound or like to alert the user regarding the identified one or more formula loops. In another example, when the alarm unit 202 correspond to the display panel. Further, the display panel may be configured to display a pop-up notification, a warning message, or like to alert the user regarding the identified one or more formula loops.

Figure 8:
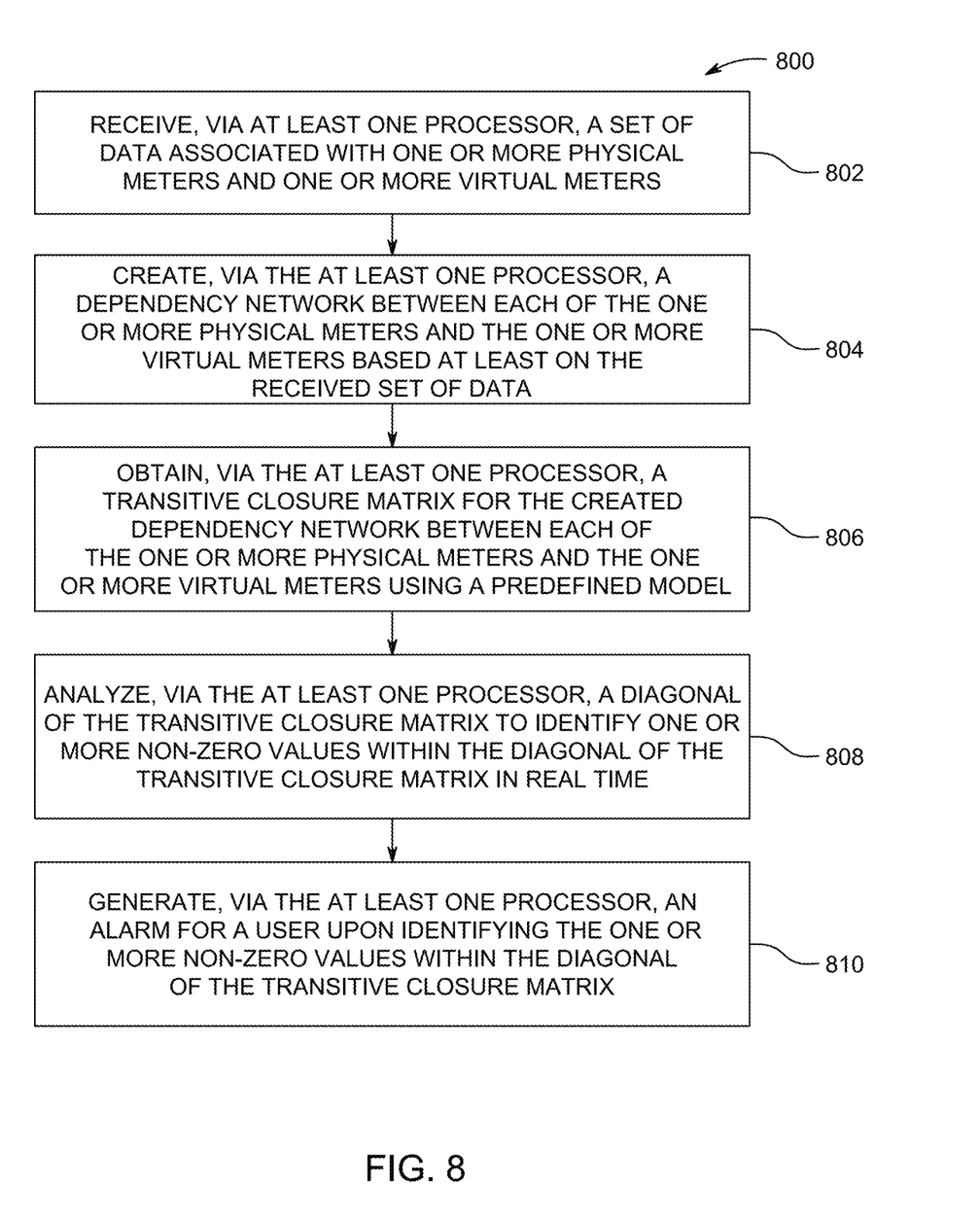
FIG. 8 illustrates a flowchart showing a method for detecting formula loops in virtual meter calculations in accordance with an example embodiment of the present disclosure.

FIG. 8 illustrates a flowchart showing a method 800 for detecting formula loops in virtual meter calculations, in accordance with an example embodiment of the present disclosure. FIG. 8 is described in conjunction with FIGS. 1-7.

At operation 802, the at least one processor 200 may be configured to receive the set of data associated with the one or more physical meters 104 and the one or more virtual meters 106. Further, the set of data may comprise the count of the one or more physical meters 104 and the one or more virtual meters 106. Further, the set of data may comprise the information related to interdependency between the one or more physical meters 104 and the one or more virtual meters 106. Further, the at least one processor 200 may be configured to receive the first set of data for a pre-defined period of time. In some embodiments, the pre-defined period of time may comprise at least day, weeks, months, years.

In one example, a building is installed with one or more electricity meters. The one or more electricity meters comprises METER-1 510, and METER-2 512. Further, each of the one or more electricity meters are linked with one or more virtual meters 106. Further, the one or more virtual meters 106 comprises VIRTUAL METER-1 502 and VIRTUAL METER-2 504. Further, the building comprises a remote building manager. Further, the remote building manager is configured to transmit a set of data (i.e., count of the one or more electricity meters and count of the one or more virtual meters 106) to at least one processor 200 of a server 108. The server 108 is communicatively coupled to the remote building manager via the network 102.

At operation 804, the at least one processor 200 may be configured to create the dependency network between each of the one or more physical meters 104 and the one or more virtual meters 106 based at least one the received set of data. Further, the dependency network may be configured to represent the interdependency between the each of the one or more physical meters 104 and the one or more virtual meters 106. In some embodiments, the interdependency may correspond to at least one physical meter from the one or more physical meters 104 may be interconnected to at least one virtual meter from the one or more virtual meters 106. In some embodiments, the dependency network may be configured to represent flow of data between each of the one or more physical meters 104 and each of the one or more virtual meters 106.

In one example, the at least one processor 200 is configured to create a dependency network between the one or more electricity meters and the one or more virtual meters 106. Further, based at least on the created dependency network, the METER-1 510 is linked to the VIRTUAL METER-1 502. Further, the METER-2 512 is linked to the VIRTUAL METER-1 502 and the VIRTUAL METER-2 504. Further, the VIRTUAL METER-1 502 and the VIRTUAL METER-2 504 are dedicated to tack the electricity usage of specific equipment, like HVAC systems, installed within the building.

At operation 806, the at least one processor 200 may be configured to obtain the transitive closure matrix for the created dependency network between each of the one or more physical meters 104 and the one or more virtual meters 106 using the predefined model. Further, the transitive closure matrix may represent the one or more shortest paths between each of the one or more physical meters 104 and the one or more virtual meters 106. Further, the predefined model may correspond to the Warshall algorithm based model. Further, the Warshall algorithm based model may be configured to determine the one or more shortest paths between the one or more physical meters 104 and the one or more virtual meters 106.

In some embodiments, the Warshall algorithm based model may be configured to define a topology between each physical meter from the one or more physical meters 104 with each virtual meter from the one or more virtual meters 106. Further, the topology may be configured to comprise a plurality of possible routes between each of the one or more physical meters 104 and each of the one or more virtual meters 106. Further, the transitive closure matrix may comprise a plurality of rows and a plurality of columns. Further, each of the rows from the plurality of rows and each of the columns from the plurality of columns may be configured to represent an individual pathway depicting the interdependency between each of the one or more physical meters 104 with each of the one or more virtual meters 106.

In one example, the at least one processor 200 is configured to obtain a transitive closure matrix for the created dependency network between each of the one or more electricity meters and the one or more virtual meters 106 using a Warshall algorithm. Further, based on the transitive closure matrix one or more shortest paths may be represented between the one or more electricity meters and the one or more virtual meters 106. Further, based at least on the obtained transitive matrix, the VIRTUAL METER-1 502 is linked to the METER-1 510 and METER-2 512. Further, the VIRTUAL METER-2 504 is linked to the METER-2 512.

At operation 808, the at least one processor 200 may be configured to analyze the diagonal of the transitive closure matrix to identify the one or more non-zero values within the diagonal of the transitive closure matrix in real-time. Further, the one or more non-zero values may correspond to the one or more formula loops within the diagonal of the transitive closure matrix.

In one example, the at least one processor 200 is configured to analyze a diagonal of the transitive closure matrix to identify one or more non-zero values within the diagonal of the transitive closure matrix. Further, the diagonal represents a correlation between each of the electricity meters with each of the one or more virtual meters 106. Further, based on the one or more non-zero values, the one or more physical meters 104 and the one or more virtual meters 106 in one or more formula loops are identified.

At operation 810, the at least one processor 200 may be configured to generate the alarm for the user upon identifying the one or more non-zero values within the diagonal of the transitive closure matrix. Further, the alarm for the user may be generated using the alarm unit 202, upon identifying the one or more non-zero values within the diagonal of the transitive closure matrix. Further, the alarm unit 202 may correspond to a speaker, a display panel or like. In at least one example, when the alarm unit 202 corresponds to the speaker. Further, the speaker may be configured to generate a beep sound, a siren sound or like to alert the user regarding the identified one or more formula loops. In another example, when the alarm unit 202 correspond to the display panel. Further, the display panel may be configured to display a pop-up notification, a warning message, or like to alert the user regarding the identified one or more formula loops.

In one example, the at least one processor 200 is configured to generate an alarm for a user, upon identifying the one or more non-zero values within the diagonal of the of the transitive closure matrix. Further, the at least one processor 200 may be configured to direct a display panel to show a warning message to alert the user regarding the one or more physical meters 104 and the one or more virtual meters 106 identified with the one or more formula loops.

In some embodiments, the system 100 may comprise at least one non-transitory machine-readable medium including data, which when used by at least one processor 200, causes the at least one processor 200 to perform instructions that cause the at least one processor 200 to perform operations comprising receiving a set of data associated with one or more physical meters 104 and one or more virtual meters 106. The set of data may comprise a count of the one or more physical meters 104 and the one or more virtual meters 106 and information related to interdependency between the one or more physical meters 104 and the one or more virtual meters 106. Further, the operations may comprise creating a dependency network between each of the one or more physical meters 104 and the one or more virtual meters 106 based at least on the received set of data. The dependency network may represent the interdependency between the each of the one or more physical meters 104 and the one or more virtual meters 106.

Further, the operations may comprise obtaining a transitive closure matrix for the created dependency network between each of the one or more physical meters 104 and the one or more virtual meters 106 using a predefined model. The transitive closure matrix may represent one or more shortest paths between each of the one or more physical meters 104 and the one or more virtual meters 106. Further, the operations may comprise analyzing a diagonal of the transitive closure matrix to identify one or more non-zero values within the diagonal of the transitive closure matrix in a real time. Thereafter, the operations may comprise generating an alarm for a user upon identifying the one or more non-zero values within the diagonal of the transitive closure matrix.

The present disclosure may provide efficiency, low error percentage, and resource optimization. Firstly, by receiving the set of data associated with the one or more physical meters 104 and the one or more virtual meters 106 time and efforts may be reduced. The Warshall algorithm may enhance scalability of the one or more physical meters 104 and the one or more virtual meters 106. The at least one processor 200 may efficiently handle a network of the one or more physical meters 104 and the one or more virtual meters 106 that may range upto hundreds, by using the Warshall algorithm. Embodiments may support addition of other physical meters 104 or virtual meters 106. Embodiments may eliminate a need for manual auditing of meter dependencies thereby contributing to a significant cost savings. Embodiments may be utilized for various complex metering networks, that leads to operational efficiency and cost-effectiveness.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, via at least one processor, a set of data associated with one or more physical meters and one or more virtual meters, wherein the set of data comprises a count of the one or more physical meters and the one or more virtual meters and information related to interdependency between the one or more physical meters and the one or more virtual meters;
   creating, via the at least one processor, a dependency network between each of the one or more physical meters and the one or more virtual meters based at least on the received set of data, wherein the dependency network represents the interdependency between the each of the one or more physical meters and the one or more virtual meters;
   obtaining, via the at least one processor, a transitive closure matrix for the created dependency network between each of the one or more physical meters and the one or more virtual meters using a predefined model, wherein the transitive closure matrix represents one or more shortest paths between each of the one or more physical meters and the one or more virtual meters;
   analyzing, via the at least one processor, a diagonal of the transitive closure matrix to identify one or more non-zero values within the diagonal of the transitive closure matrix in a real time; and
   generating, via the at least one processor, an alarm for a user upon identifying the one or more non-zero values within the diagonal of the transitive closure matrix.

2. The method of claim 1, wherein the predefined model corresponds to a Warshall algorithm based model, wherein the Warshall algorithm based model is configured to determine the one or more shortest paths between each of the one or more physical meters and the one or more virtual meters.

3. The method of claim 1, wherein the alarm for the user is generated using an alarm unit communicatively coupled to the at least one processor, upon identifying the one or more non-zero values within the diagonal of the transitive closure matrix.

4. The method of claim 1, wherein the one or more non-zero values correspond to one or more formula loops within the diagonal of the transitive closure matrix.

5. The method of claim 4 further comprising indicating, via the at least one processor, at least one of the one or more physical meters and the one or more virtual meters identified with the one or more formula loops over a user interface equipped by the user.

6. The method of claim 5 further comprising altering, via the at least one processor, the identified one or more formula loops using the user interface equipped by the user.

7. The method of claim 6 further comprising updating, via the at least one processor, the transitive closure matrix upon detecting the alteration in the count of the one or more physical meters and the one or more virtual meters in the real time.

8. A system comprising:
a memory; and
at least one processor communicatively coupled to the memory, wherein the at least one processor is configured to:
receive a set of data associated with one or more physical meters and one or more virtual meters, wherein the set of data comprises a count of the one or more physical meters and the one or more virtual meters and information related to interdependency between the one or more physical meters and the one or more virtual meters;
create a dependency network between each of the one or more physical meters and the one or more virtual meters based at least on the received set of data, wherein the dependency network represents the interdependency between the each of the one or more physical meters and the one or more virtual meters;
obtain a transitive closure matrix for the created dependency network between each of the one or more physical meters and the one or more virtual meters using a predefined model, wherein the transitive closure matrix represents one or more shortest paths between each of the one or more physical meters and the one or more virtual meters;
analyze a diagonal of the transitive closure matrix to identify one or more non-zero values within the diagonal of the transitive closure matrix in a real time; and
generate an alarm for a user upon identifying the one or more non-zero values within the diagonal of the transitive closure matrix.

9. The system of claim 8, wherein the predefined model corresponds to a Warshall algorithm based model, wherein the Warshall algorithm based model is configured to determine the one or more shortest paths between each of the one or more physical meters and the one or more virtual meters.

10. The system of claim 8, wherein the alarm for the user is generated using an alarm unit communicatively coupled to the at least one processor, upon identifying the one or more non-zero values within the diagonal of the transitive closure matrix.

11. The system of claim 8, wherein the one or more non-zero values correspond to one or more formula loops within the diagonal of the transitive closure matrix.

12. The system of claim 11, wherein the at least one processor is configured to indicate at least one of the one or more physical meters and the one or more virtual meters identified with the one or more formula loops over a user interface equipped by the user.

13. The system of claim 12, wherein the at least one processor is configured to alter the identified one or more formula loops using the user interface equipped by the user.

14. The system of claim 13, wherein the at least one processor is configured to update the transitive closure matrix upon detecting the alteration in the count of the one or more physical meters and the one or more virtual meters in the real time.

15. A non-transitory machine-readable information storage medium comprising one or more instructions which when executed by at least one processor to perform operations comprising:
receiving a set of data associated with one or more physical meters and one or more virtual meters, wherein the set of data comprises a count of the one or more physical meters and the one or more virtual meters and information related to interdependency between the one or more physical meters and the one or more virtual meters;
creating a dependency network between each of the one or more physical meters and the one or more virtual meters based at least on the received set of data, wherein the dependency network represents the interdependency between the each of the one or more physical meters and the one or more virtual meters;
obtaining a transitive closure matrix for the created dependency network between each of the one or more physical meters and the one or more virtual meters using a predefined model, wherein the transitive closure matrix represents one or more shortest paths between each of the one or more physical meters and the one or more virtual meters;
analyzing a diagonal of the transitive closure matrix to identify one or more non-zero values within the diagonal of the transitive closure matrix in a real time; and
generating an alarm for a user upon identifying the one or more non-zero values within the diagonal of the transitive closure matrix.

16. The non-transitory machine-readable information storage medium of claim 15, wherein the predefined model corresponds to a Warshall algorithm based model, wherein the Warshall algorithm based model is configured to determine the one or more shortest paths between each of the one or more physical meters and the one or more virtual meters.

17. The non-transitory machine-readable information storage medium of claim 15, wherein the alarm for the user is generated using an alarm unit communicatively coupled to the at least one processor, upon identifying the one or more non-zero values within the diagonal of the transitive closure matrix, and wherein the one or more non-zero values correspond to one or more formula loops within the diagonal of the transitive closure matrix.

18. The non-transitory machine-readable information storage medium of claim 17, wherein the at least one processor is configured to indicate at least one of the one or more physical meters and the one or more virtual meters identified with the one or more formula loops over a user interface equipped by the user.

19. The non-transitory machine-readable information storage medium of claim 18, wherein the at least one processor is configured to alter the identified one or more formula loops using the user interface equipped by the user.

20. The non-transitory machine-readable information storage medium of claim 19, wherein the at least one processor is configured to update the transitive closure matrix upon detecting the alteration in the count of the one or more physical meters and the one or more virtual meters in the real time.

* * * * *